United States Patent

[11] 3,565,106

| [72] | Inventor | William J. Baumbach |
| | | 4147 Wilson Blvd., Arlington, Va. 22203 |
| [21] | Appl. No. | 773,887 |
| [22] | Filed | Nov. 6, 1968 |
| [45] | Patented | Feb. 23, 1971 |

[54] DIAPHRAGM FOR FLOOD AND SUDS CONTROL
5 Claims, 5 Drawing Figs.

| [52] | U.S. Cl. | 137/513.3, 137/525.1 |
| [51] | Int. Cl. | F16k 15/14 |
| [50] | Field of Search | 137/513.3, 525.1 |

[56] References Cited
UNITED STATES PATENTS

| 2,236,293 | 3/1941 | Lund | 137/525.1X |
| 2,524,764 | 10/1950 | Burke | 137/525.1X |
| 2,674,318 | 4/1954 | Sutliff | 137/525 |
| 3,047,013 | 7/1962 | Baumbach | 137/525.1 |
| 3,104,787 | 9/1963 | Thompson, Jr. | 137/525.1X |

*Primary Examiner*—Robert G. Nilson
*Attorneys*—Clarence A. O'Brien and Harvey B. Jacobson ABSTRACT: A diaphragm-type control valve for installation in drain lines and the like to prevent backflow of water through said drain line which sometimes occurs due to floods and the like. A generally conical tubular body is provided with spiral vanes thereon reinforced with pins to prevent eversion of the diaphragm and apertures are provided at the lower portion of the diaphragm for ventilation purposes.

PATENTED FEB 23 1971  3,565,106
Fig. 1
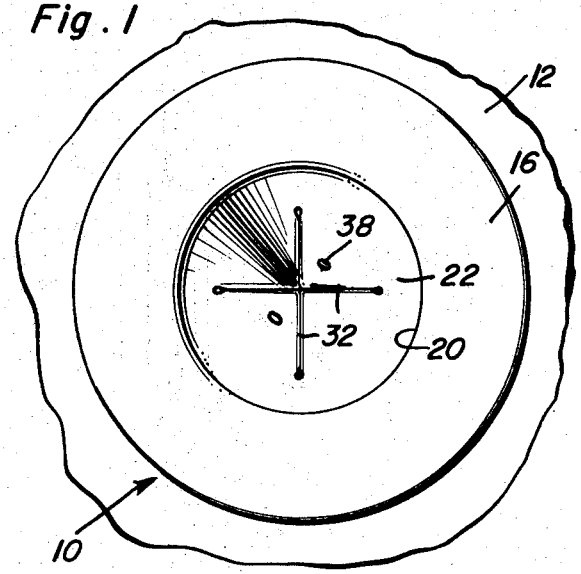
Fig. 4
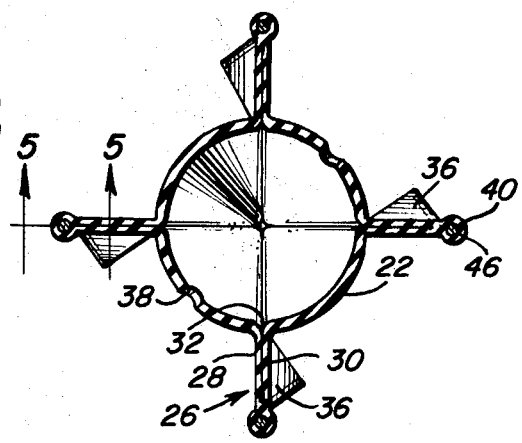
Fig. 2
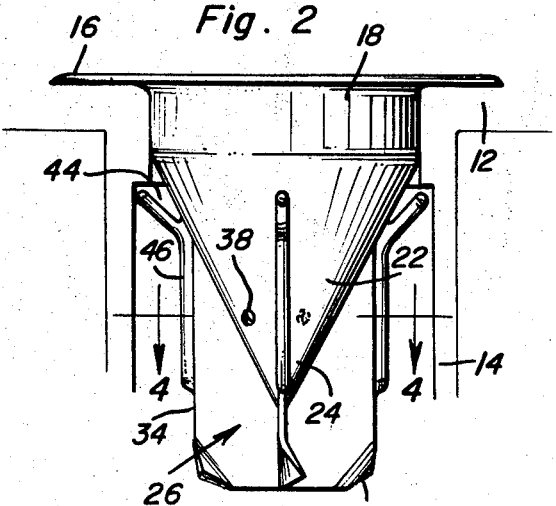
Fig. 5
Fig. 3
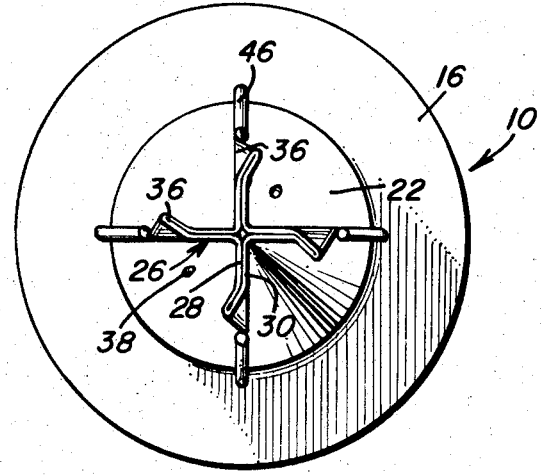
William J. Baumbach
INVENTOR.
BY *Clarence A. O'Brien*
and *Harvey B. Jackson*
Attorneys

DIAPHRAGM FOR FLOOD AND SUDS CONTROL

The present invention generally relates to a diaphragm type of check valve or backflow-preventing valve employed in drain lines and the like to prevent backflow through the drain line in the event of flooding and also to prevent such backflow which sometimes occurs due to suds being discharged along with water in which clothes have been washed.

In prior U.S. Pat. No. 3,047,013, there is disclosed a diaphragm valve, the diaphragm to prevent backflow and the present invention incorporates various improvements in the structure and operation of the device illustrated in that patent.

As is well known, water sometimes backflows through drain lines during flood conditions and frequently results in flooded basements and the like. In addition, many of the detergents and cleaning solutions now being employed in washing dishes, clothes and the like frequently build up suds in the drain lines and frequently backflow from such drain line.

It is an object of the present invention to provide a diaphragm valve which will enable flow through the drain line in one direction but will prevent backflow in the other direction and is in the form of a diaphragm valve having a flange for attachment to a fitting, a generally conical flexible and resilient tubular member extending in the direction of flow with a plurality of vanes formed thereon which define slit-like openings capable of expansion and contraction during flow therethrough with the vanes being spiral in one direction so that when back pressure is exerted thereon, they will be spiralled in that direction to securely close the passage through the diaphragm thus forming a check valve.

Another object of the present invention is to provide a diaphragm in accordance with the preceding object in which the vanes are provided with reinforcing pins or ribs along the outer edge thereof to prevent eversion of the diaphragm due to back pressure.

Still another object of the present invention is to provide a diaphragm valve of this type having vent holes adjacent the tip of the generally conical member to eliminate siphoning action of the diaphragm valve.

Still another object of the present invention is to provide a diaphragm valve which may be installed in various positions in various drain lines to prevent backflow therein and which is simple in construction, easy to install, effective for its purposes and relatively inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a top plan view of the diaphragm valve;

FIG. 2 is a side elevational view thereof;

FIG. 3 is a bottom plan view thereof;

FIG. 4 is a transverse, plan sectional view taken substantially upon a plane passing along section line 4—4 of FIG. 2; and FIG. 5 is a detailed sectional view, on an enlarged scale, taken substantially upon a plane passing along section line 5—5 of FIG. 4 illustrating the specific construction of the reenforcement pins employed on the vanes.

Referring now specifically to the drawings, the diaphragm is generally designated by reference numeral 10 and is illustrated installed within a fitting 12 of a drain line 14 which may be any type of drain line. The diaphragm 10 includes a relatively thick and substantially circular base or flange 16 resting on the fitting 12 and secured thereto in any suitable manner (not shown) with the flange 16 being solid or perforated to receive fasteners depending upon the particular installation.

Depending from and formed integrally with the base or flange 16 is a substantially cylindrical body portion 18 which defines a circular inlet area 20 in the upper end of the diaphragm 10 which forms an entrance for fluids passing therethrough. Depending from and integral with the cylindrical body portion 18 is a generally conical body portion 22 which tapers down to an apex 24 at the lower end thereof.

Formed integrally with the conical body 22 is a plurality of vanes each generally being designated by the numeral 26 with each vane being formed by a pair of flexible resilient panels 28 and 30 which are integral with an adjacent corresponding portion of the conical body 22 thus defining an entrance slit or area 32 communicating with the interior of the conical body 22 and thus forming an expansion area for enabling the conical portion 22 to expand, particularly, in the lower end portion thereof inasmuch as the vanes 26 have their inner edge corresponding to the slope of the conical portion 22 and their outer edge at 34 extending substantially parallel with the center line of the entrance area 20.

As illustrated in FIG. 2, the vanes 26 extend below the apex lower end 24 of the conical portion 22 and terminate in a spirally deformed outer corner 36 in which the deformed corners 36 are deformed or extended spirally in a clockwise direction as observed in FIG. 3.

The conical portion 22 provided with a plurality of vent apertures 38 therein with at least one vent aperture disposed in opposite quadrants of the conical member 22.

As illustrated in the drawings, each vane 26 is provided with a reinforcing rod or pin 40 along the outer edge thereof from a point generally in alignment with the lower apex portion 24 up to where the outer edge 34 of the vane 26 merges with the conical portion 22. The reinforcing rod or pin 40 then extends angularly outwardly as indicated by numeral 42 in diverging relationship to the adjacent surface of the conical portion 22 with the space therebetween generally being designated by numeral 44 as illustrated in FIG. 5. The reinforcing rod 40 is encased in a covering or coating 46 of the same material as the vanes 26 and the conical body 22. The reinforcing rod or pin 40 serves to prevent eversion of the diaphragm valve when back pressure or backflow is exerted thereon.

The diaphragm is constructed of a noncorrosive material such as natural rubber, plastics or the like and is of one-piece construction. The material from which the diaphragm is manufactured is highly resilient and flexible and is formed so that the slits 32 are normally closed as illustrated in FIG. 3. In this condition, if backflow pressure is exerted against the undersurface of the diaphragm, the spiral offset construction 36 will cause the vanes to become more or less nested in a spiral manner as the depending conical portion of the check valve attempts to collapse thus forming an effective check valve against backflow. The reinforcing rods or pins 40 serve to prevent eversion of the highly flexible conical portion and vanes when a back pressure is exerted thereon thereby assuring that the diaphragm will not turn inside out which, of course, would render the device inoperative as a valve. The small apertures 38 are for the purpose of enabling venting of the drain pipe to prevent siphoning action with the overlapping vanes serving to close the openings when the device is serving as a check valve.

The diaphragm may be conveniently positioned within a plumbing fixture such as a drain line in a basement, deep tubs, through lines or wherever a one-way flow path is desired. The device may be constructed in various sizes and configurations for the particular installation desired.

The foregoing is considered as illustrative only of the principles of the invention. Further, since numerous modifications and changes will readily occur to those skilled in the art, it is not desired to limit the invention to the exact construction and operation shown and described and accordingly all suitable modifications and equivalents may be resorted to falling within the scope of the invention.

I claim:

1. A diaphragm for use in a flow path to prevent backflow therethrough comprising a base, a normally closed generally conical body depending from said base and being divided into a plurality of circumferentially spaced and longitudinally extending segments, each segment being defined by a vane to enable extension and contraction of the conical body to enable flow in one direction and prevent backflow, said vanes and conical body being formed of resilient material whereby the smaller tip end of the conical body and the vanes may open in response to flow in one direction and collapse to prevent backflow, means reinforcing said vanes to prevent eversion thereof, said means reinforcing the vanes including a rib along the external edge thereof, and a reinforcing rod in said rib and being completely enclosed therein, the upper end of said rib and the upper end of said reinforcing rod being angularly offset in diverging relation to the surface of the conical body and normally spaced therefrom but engaging the body during upward movement of the tip of the conical body thereby preventing eversion of the upper end portion of the conical body.

2. The structure as defined in claim 1 wherein each of said vanes extends below the smaller tip end of the conical body and terminates in a spiral offset outer corner so that the vanes will collapse in a spiral manner when backflow pressure is exerted thereon.

3. The structure as defined in claim 2 wherein the portion of said conical body disposed between at least one pair of adjacent vanes is provided with a vent aperture.

4. A diaphragm for use in a flow path to prevent backflow therethrough comprising a base, a normally closed generally conical body depending from said base and being divided into a plurality of circumferentially spaced and longitudinally extending segments, each segment being defined by a vane to enable extension and contraction of the conical body to enable flow in one direction and prevent backflow, said vanes and conical body being formed of resilient material whereby the smaller tip end of the conical body and the vanes may open in response to flow in one direction and collapse to prevent backflow, each of said vanes extending below the smaller tip end and including an outer edge substantially parallel to the longitudinal axis of the conical body, a reinforcing rib extending along the outer edge of each vane with the lower end of the rib terminating in substantially the same horizontal plane as the smaller tip end of the conical body thereby enabling the conical body to expand without interference from the ribs and collapse of the portion of the vanes below the smaller tip end without interference from the ribs.

5. The structure as defined in claim 4 wherein each of said ribs includes a reinforcing rod therein, the lower ends of said vanes being spirally offset for collapse in a spiral manner without interference from the rib and reinforcing rod.